(12) United States Patent
Kondo et al.

(10) Patent No.: US 6,810,454 B2
(45) Date of Patent: *Oct. 26, 2004

(54) INFORMATION PROCESSING APPARATUS HAVING A BUS USING THE PROTOCOL OF THE ACKNOWLEDGE TYPE IN THE SOURCE CLOCK SYNCHRONOUS SYSTEM

(75) Inventors: Nobukazu Kondo, Ebina (JP); Ikuya Kawasaki, Kodaira (JP); Koki Noguchi, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/337,729

(22) Filed: Jan. 8, 2003

(65) Prior Publication Data

US 2003/0101299 A1 May 29, 2003

Related U.S. Application Data

(63) Continuation of application No. 09/389,227, filed on Sep. 3, 1999.

(30) Foreign Application Priority Data

Sep. 4, 1998 (JP) .......................................... 10-250710

(51) Int. Cl.[7] ............................................. G06F 13/00
(52) U.S. Cl. ..................................................... 710/110
(58) Field of Search .......................... 710/61, 110, 105, 710/106, 305; 709/248, 400; 713/320, 322–324, 400, 500, 600; 714/1, 2, 48, 49, 707, 746, 748, 775, 799

(56) References Cited

U.S. PATENT DOCUMENTS 4,342,995 A * 8/1982 Shima ..................... 340/825.5
4,654,654 A    3/1987 Butler et al.
4,873,703 A   10/1989 Crandall et al. ............. 375/371
4,965,793 A   10/1990 Polzin et al.

(List continued on next page.)

FOREIGN PATENT DOCUMENTS

| EP | 0644475 A2 | * | 3/1995 | ............. G06F/1/32 |
| EP | 0411759 B1 | | 10/1997 | |
| JP | 3058263 | | 7/1990 | |
| JP | 06-214950 | | 8/1994 | |
| JP | 406223037 A | * | 8/1994 | ............ G06F/13/42 |
| JP | 408263397 A | * | 10/1996 | ............ G06F/13/00 |
| JP | 361259357 A | * | 11/1996 | ............ G06F/13/20 |

OTHER PUBLICATIONS

Tawfik Arabi et al, "Modeling, Simulation, and Design Methodology of the Interconnect and Packaging of an Ultra–High Speed Source Synchronous Bus", 1998, IEEE pp. 8–11.*

*Primary Examiner*—Xuan M. Thai
(74) *Attorney, Agent, or Firm*—Antonelli, Terry, Stout & Kraus, LLP

(57) ABSTRACT

An information processing apparatus includes a master module serving as a transfer source, a slave module serving as a transfer destination, a bus of a source clock synchronous system, and a means for transferring a signal based upon a protocol of an acknowledge type from the slave module to the master module via the bus of the source clock synchronous system. In the information processor, the signals of the acknowledge type are also transferred in the source clock synchronous system by using a source clock signal dedicated to signals of the acknowledge type. Therefore, it is prevented that the master side fails in acquiring signals of the acknowledge type from the slave side, and the reliability of the source clock synchronous bus and the data efficiency can be improved.

10 Claims, 11 Drawing Sheets

U.S. PATENT DOCUMENTS

| | | | | |
|---|---|---|---|---|
| 5,008,904 A | | 4/1991 | Mangelsdorf et al. | |
| 5,029,124 A | | 7/1991 | Leahy et al. | 370/438 |
| 5,237,676 A | * | 8/1993 | Arimilli et al. | 710/110 |
| 5,428,753 A | | 6/1995 | Kondo et al. | 710/107 |
| 5,428,758 A | * | 6/1995 | Salsburg | 711/165 |
| 5,613,077 A | * | 3/1997 | Leung et al. | 710/305 |
| 5,628,019 A | * | 5/1997 | O'Brien | 713/322 |
| 5,630,145 A | * | 5/1997 | Chen | 713/322 |
| 5,768,529 A | | 6/1998 | Nikel et al. | 375/355 |
| 5,915,130 A | | 6/1999 | Kim | |
| 5,919,254 A | | 7/1999 | Pawlowski et al. | 710/104 |
| 5,963,609 A | | 10/1999 | Huang | 375/377 |
| 6,055,285 A | | 4/2000 | Alston | 375/372 |
| 6,141,765 A | * | 10/2000 | Sherman | 713/400 |
| 6,145,039 A | | 11/2000 | Ajanovic et al. | 710/105 |
| 6,336,159 B1 | | 1/2002 | MacWilliams et al. | 710/105 |
| 6,381,293 B1 | | 4/2002 | Lee et al. | |
| 6,389,568 B1 | * | 5/2002 | Leshay et al. | 714/749 |
| 6,539,444 B1 | * | 3/2003 | Kondo et al. | 710/110 |
| 6,665,807 B1 | * | 12/2003 | Kondo et al. | 713/400 |
| 2002/0065967 A1 | * | 5/2002 | MacWilliams et al. | 710/105 |

* cited by examiner

| ACK[1] | ACK[2] | MEANING |
|---|---|---|
| 0 | 0 | NO ANSWER |
| 1 | 0 | ACKNOWLEDGE |
| 0 | 1 | RETRY REQUEST |
| 1 | 1 | ERROR |

| [0-3] | | | | TRANSFER CLASS | [0-3] | | | | TRANSFER CLASS |
|---|---|---|---|---|---|---|---|---|---|
| 0 | 0 | 0 | 0 | 1 BYTE READ | 0 | 0 | 0 | 1 | 1 BYTE WRITE |
| 1 | 0 | 0 | 0 | 2 BYTE READ | 1 | 0 | 0 | 1 | 2 BYTE WRITE |
| 0 | 1 | 0 | 0 | 4 BYTE READ | 0 | 1 | 0 | 1 | 4 BYTE WRITE |
| 1 | 1 | 0 | 0 | 8 BYTE READ | 1 | 1 | 0 | 1 | 8 BYTE WRITE |
| 0 | 0 | 1 | 0 | 16 BYTE READ | 0 | 0 | 1 | 1 | 16 BYTE WRITE |
| 1 | 0 | 1 | 0 | 32 BYTE READ | 1 | 0 | 1 | 1 | 32 BYTE WRITE |
| 0 | 1 | 1 | 0 | 64 BYTE READ | 0 | 1 | 1 | 1 | 64 BYTE WRITE |
| 1 | 1 | 1 | 0 | 256 BYTE READ | 1 | 1 | 1 | 1 | 256 BYTE WRITE |

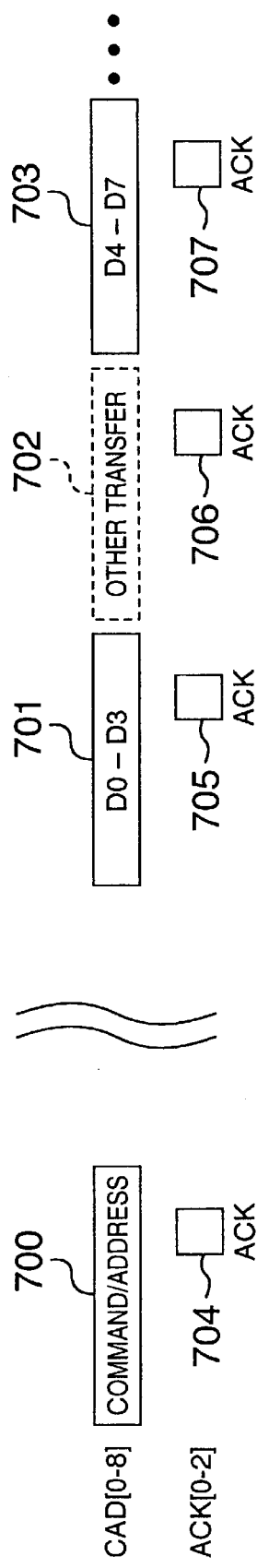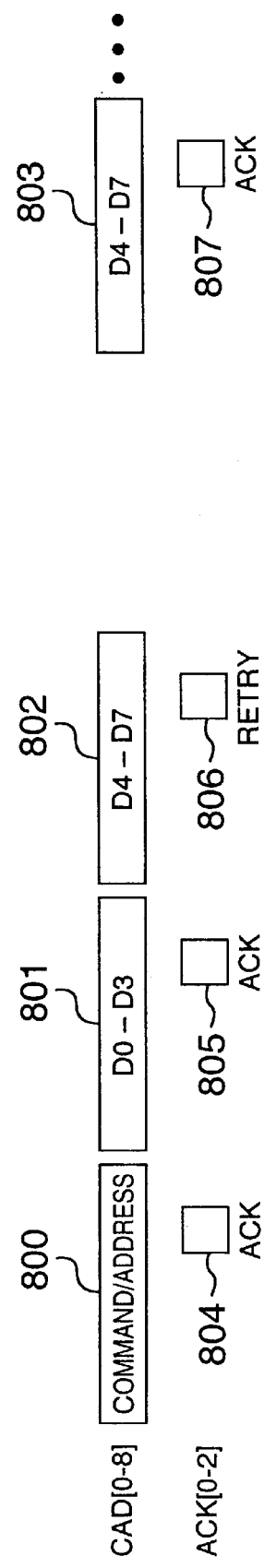

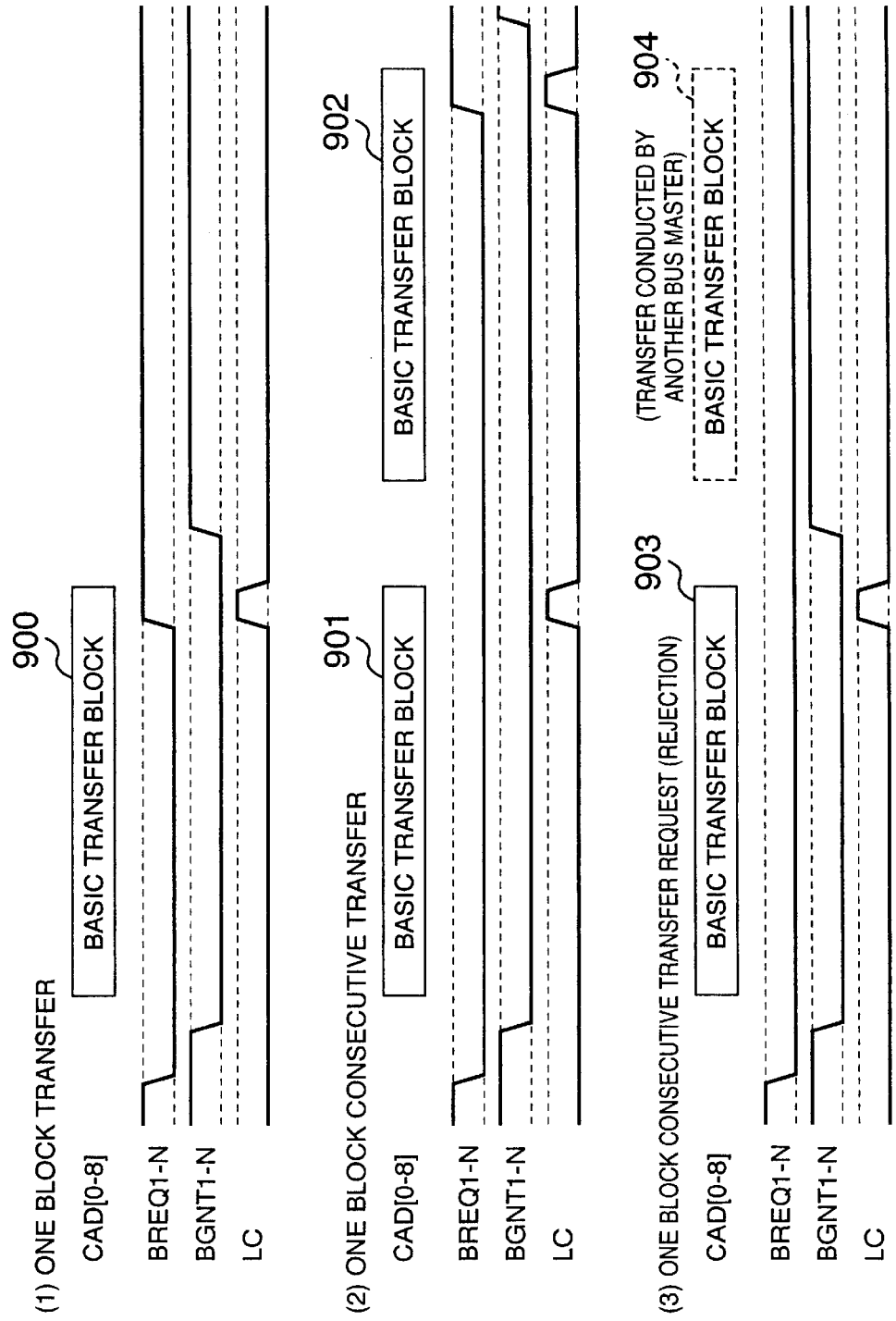

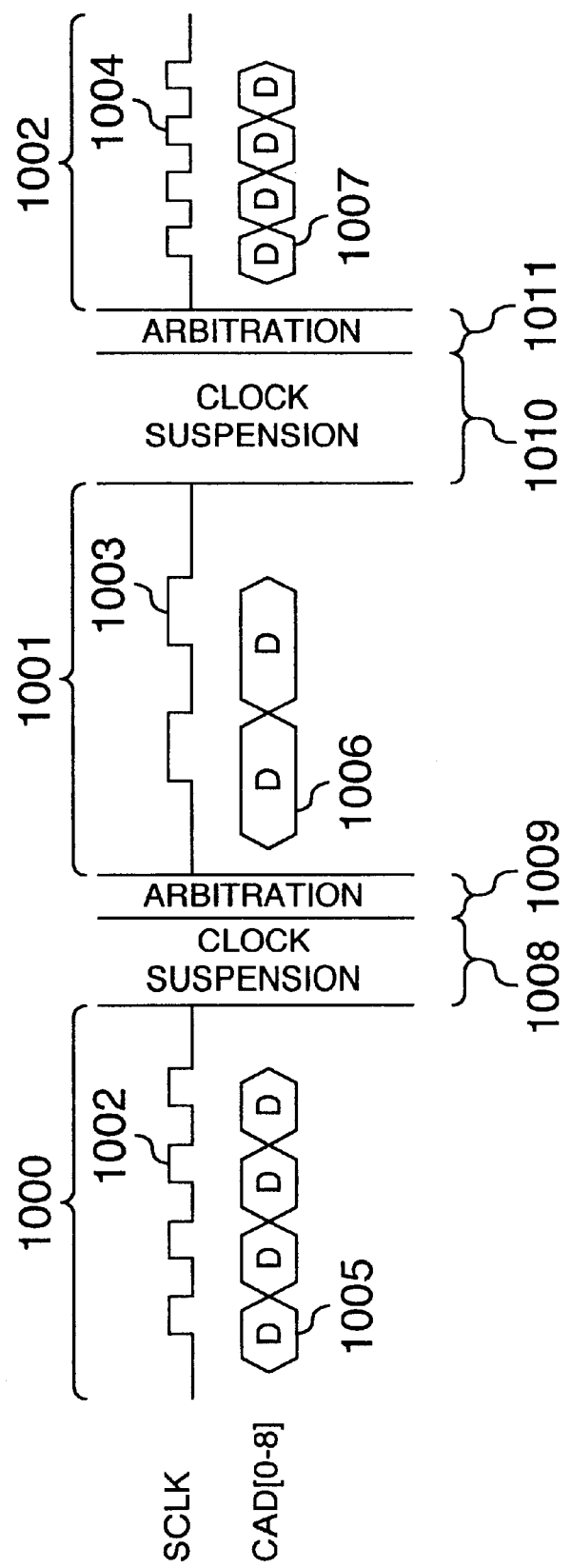

INFORMATION PROCESSING APPARATUS HAVING A BUS USING THE PROTOCOL OF THE ACKNOWLEDGE TYPE IN THE SOURCE CLOCK SYNCHRONOUS SYSTEM

CROSS REFERENCE TO RELATED APPLICATION

This application related to U.S. patent application Ser. No. 09/389,228, filed Sep. 3, 1999, based on Japanese Patent Application No. 11-228241, filed Aug. 12, 1999, entitled "INFORMATION PROCESSING APPARATUS" by N. Kondo et al. This is a continuation of parent application Ser. No. 09/389,227, filed Sep. 3, 1999, allowed.

BACKGROUND OF THE INVENTION

1. Field of the Invention

The present invention relates to an information processing apparatus such as personal computers and work stations, and in particular to protocols of buses of these information processing apparatuses and internal buses of LSIs used in the information processing apparatus.

2. Description of the Related Art

As for the conventional technique concerning buses used in information processors such as personal computers and work stations, and concerning control methods of the buses, there is known a technique described in U.S. Pat. No. 5,428,753 assigned to the present assignee. As described therein, a synchronous bus has become a main stream since the design of the interface circuit is facilitated. In the synchronous bus, a plurality of modules connected to the bus conduct data transmission and reception control in synchronism with common clock timing. A typical synchronous bus configuration and its timing chart are shown in FIGS. 13 and 14, respectively. In FIG. 13, numeral 1300 denotes a clock generator for distributing a common system clock among modules, Numerals 1301, 1302 and 1303 denote modules on a bus. Numeral 1301 denotes a master module serving as a transfer source of data. Numeral 1303 denotes a slave module serving as a transfer destination of data, and numeral 1304 denotes a data bus. With reference to FIGS. 13 and 14, numerals 1400 and 1401 denote timing relations between a system clock and output data observed on an output pin of the master module 1301 serving as the transfer source of data. Numerals 1402 and 1403 denote timing relations between the system clock and input data observed on an input pin of the slave module 1303 serving as the transfer destination of data. The clocks 1400 and 1402 are distributed from the clock generator 1300 of FIG. 13 with the same phase. Data on the input pin of the slave module 1303 is delayed from that on the output pin of the master module 1301 by a propagation delay time on the data bus 1304. Since data must be transferred from the master module to the slave module in one cycle, the maximum operation frequency is typically determined on a synchronous bus by a maximum propagation delay time of the bus.

SUMMARY OF THE INVENTION

For solving this problem and further raising the frequency, a bus of a "source clock synchronous system" (or a source clock synchronous bus) is conceivable. In the "source clock synchronous system", a module serving as a transfer source transmits a latch clock to be used in a module of a transfer destination together with transfer data. A bus configuration and a timing chart of a typical source clock synchronous system are shown in FIGS. 15 and 16, respectively. In FIG. 15, numeral 1500 denotes a signal line for a source clock which is transmitted from a master module serving as a transfer source to a slave module serving as a transfer destination. With reference to FIG. 16, numerals 1600 and 1601 denote timing relations between a source clock and output data observed on an output pin of the master module serving as the transfer source of data. Numerals 1602 and 1603 denote timing relations between the source clock and input data observed on an input pin of the slave module serving as the transfer destination of data. If a source clock line and a data line are mounted on similar wiring paths in the bus of the source clock synchronous system, the source clock and the data are delayed by the same phase, and consequently failures of data acquisition are reduced. In other words, the maximum operation frequency of the bus is not reflected at the time of data propagation delay. (Because data are further delayed in a remote module, but the latch clock is also delayed by the same phase.) Typically, the bus of the source clock synchronous system is such a bus that the operation frequency can be raised easily.

However, the synchronous bus is more excellent in easiness of design. A control method of signals of an acknowledge type for each transfer cycle as described in, for example, U.S. Pat. No. 5,428,753 will now be considered. FIG. 17 shows transfer timing of the synchronous bus with a protocol of the acknowledge type. In FIG. 17, numeral 1700 denotes a system clock common to modules on the bus, numeral 1701 denotes transfer data timing, and numeral 1702 denotes acknowledge signal timing. If it is determined in the synchronous bus that a signal of the acknowledge type is issued necessarily two cycles after the data transfer cycle, association of transfer data with the report of the acknowledge type is very easy. As for the protocol of the acknowledge type, there are, for example, an acknowledge for notifying the master side that the slave side has certainly received data, a retry request for requesting the master side to retransfer data later because the slave side is not ready to receive data, and an error report for notifying the master side that data received by the slave side contained an error (such as a parity error). In the bus of the source clock synchronous system allowing data transfer at a clock frequency unique to an individual module, there is a possibility that the master side and the slave do not have the same clock system. Therefore, there is a problem that it is difficult to add a protocol of the acknowledge and the retry request.

An object of the present invention is to provide a bus of source clock synchronous system with a protocol of an acknowledge type in order to operate the bus with high reliability and a high efficiency and provide an information processing apparatus having a bus using the protocol of the acknowledge type in the source clock synchronous system.

In the present invention, there is provided a source clock signal dedicated to acknowledge type signals on a signal line of a bus in order to transfer the acknowledge type signals as well by using the source clock synchronous system. Furthermore, in order to make possible control even if there are mixedly modules having different operation frequencies, an acknowledge signal is not provided for each cycle, but is provided for each basic transfer block having a substantial number of cycles.

Since the acknowledge type signals are also transferred in the source clock synchronous system by using a source clock signal dedicated to the acknowledge type signals, a failure, on the master side, of acquisition of an acknowledge type signal from the slave side is prevented. Furthermore, since an acknowledge signal is provided for each basic transfer block having a substantial number of cycles, control becomes possible even if there are mixedly modules having different operation frequencies.

In other words, in accordance with the present invention, there are provided a master module serving as a transfer source, a slave module serving as a transfer destination, a bus of a source clock synchronous system, and a means for transferring a signal based upon a protocol of an acknowledge type from the slave module to the master module via the bus of the source clock synchronous system. In the bus, there is provided a source clock signal line dedicated to the acknowledge type signals. As the master module, a processor or an I/O (input/output) device is conceivable. As the slave module, an I/O device or a storage is conceivable.

As for signals based upon the protocol of the acknowledge type, there are an acknowledge report indicating that the transfer from the master module to the slave module has been conducted, a retry request for requesting reexecution because the slave module is not ready to receive data transferred from the master module, and an error report for notifying the master module that transfer from the master module to the slave module has not been conducted correctly.

Furthermore, the acknowledge report and the retry request are sent once for a plurality of transfer cycles.

Furthermore, a method for transferring a signal of an acknowledge type includes the steps of transferring data and a source clock used as a latch clock from a master module to a slave module serving as a transfer destination via a bus of a source clock synchronous system, and transferring a signal based upon a protocol of the acknowledge type together with a source clock of the slave module from the slave module to the master module via the bus when the slave module has received the data and the latch clock transferred from the master module.

BRIEF DESCRIPTION OF THE DRAWING

FIG. 7 is a timing chart in the case where other transfer has been inserted in a data phase of read transfer;

FIG. 8 is a timing chart in the case where retry is requested from a slave module side at the time of write transfer of the present bus;

FIG. 9 is a timing chart showing details of arbitration in the case where a bus right is moved during transfer of the present bus;

FIG. 10 is a timing chart showing transfer using three different bus masters of the present bus;

DESCRIPTION OF THE EMBODIMENT

An embodiment of the present invention will now be described by referring to FIGS. 1 through 18.

Figure 1:
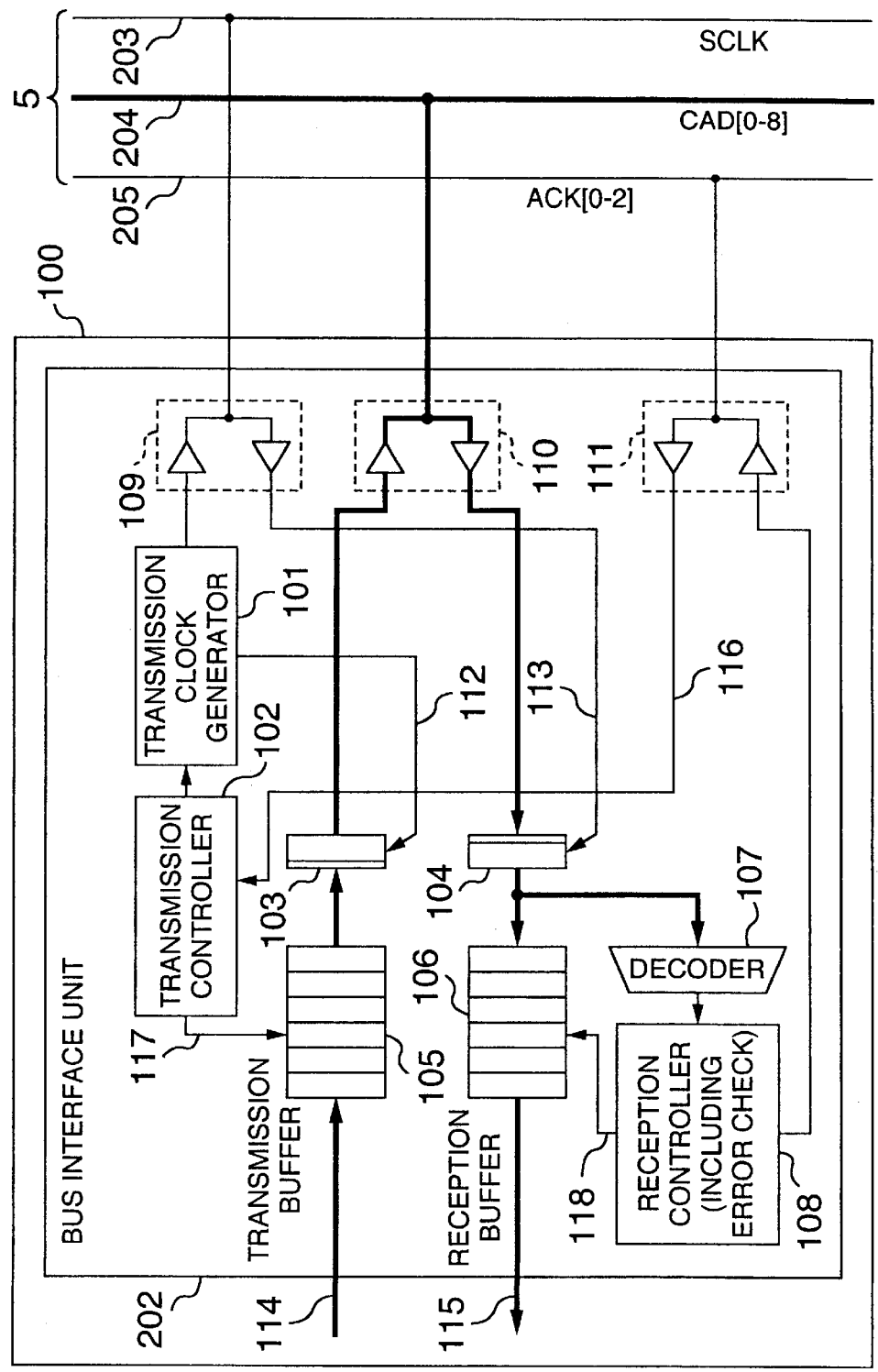
FIG. 1 is a block diagram showing an internal structure of a bus interface unit included in each of modules connected to a bus of the present invention.

In FIG. 1, numeral 100 denotes a module connected to a system bus of the present invention. Numeral 101 denotes a transmission clock generator for generating a transmission clock to be transmitted to a slave together with data. Numeral 102 denotes a transmission controller for controlling transmission timing and a transmission buffer. Numeral 103 denotes a final stage buffer for data transmission. Numeral 104 denotes an initial stage buffer for data reception. Numeral 105 denotes a transmission data buffer (including command/address/data). Numeral 106 denotes a reception data buffer (including command/address/data). Numeral 107 denotes a command/address decoder at the time of data reception. Numeral 108 denotes a reception controller for controlling the reception data buffer (including error check such as parity check of received data). Numerals 109, 110 and 111 denote bidirectional input and output buffers. Numeral 112 denotes a clock signal line for controlling timing of transmission data output. Numeral 113 denotes a latch clock signal line for reception data. Numeral 114 denotes a path of transmission data (including command/address). Numeral 115 denotes a path of reception data (including command/address). Numerals 116, 117 and 118 denote control signal lines. In FIG. 1, the reception controller 108 corresponds to the means for transferring the signal-based upon the protocol of the acknowledge type.

Figure 2:
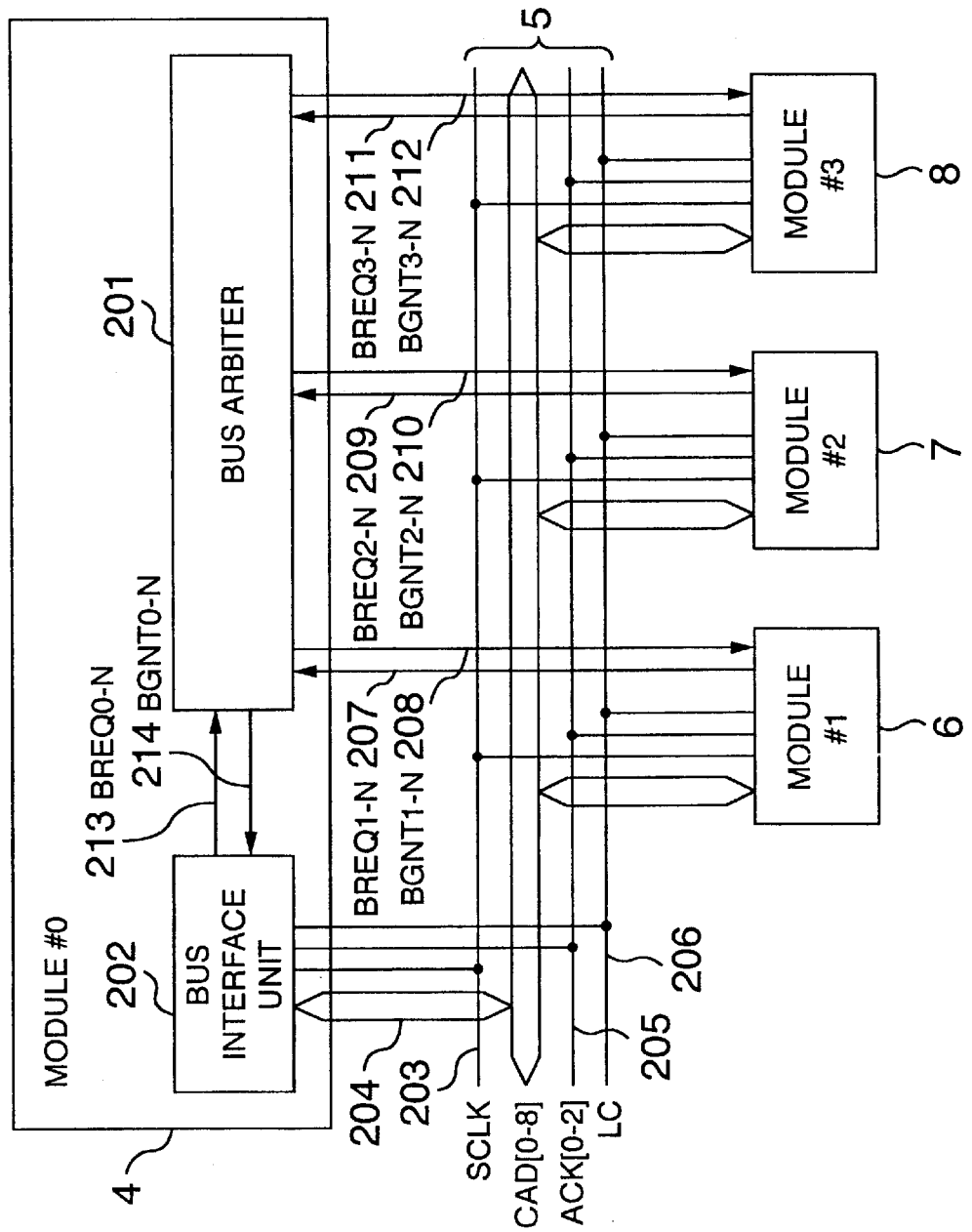
FIG. 2 is a block diagram showing connection relations using signal lines of the bus of the present invention.

In FIG. 2, numeral 201 denotes a bus arbiter for arbitrating a bus mastership of a system bus of the present embodiment. Numeral 202 denotes a system bus interface unit of a module #0 which incorporates the bus arbiter. Numeral 203 denotes a source clock signal line of the system bus whereby a master module serving as a transfer source transmits a source clock signal with data to a slave module serving as a transfer destination. Numeral 204 denotes multiplexed command/address/data lines of the system bus. Numeral 205 denotes acknowledge type signal lines (acknowledge, retry request, and error) of the system bus. Numeral 206 denotes a last cycle signal line for giving a previous notice that a bus master will release the bus mastership. Numeral 207 denotes a bus mastership request signal (BREQ1-N) sent from a module #1 to the bus arbiter. Numeral 208 denotes a bus use grant signal (BGNT1-N) sent from the bus arbiter to the module #1. Numeral 209 denotes a bus mastership request signal (BREQ2-N) sent from a module #2 to the bus arbiter. Numeral 210 denotes a bus use grant signal (BGNT2-N)

sent from the bus arbiter to the module #2. Numeral 211 denotes a bus mastership request signal (BREQ3-N) sent from a module #3 to the bus arbiter. Numeral 212 denotes a bus use grant signal (BGNT3-N) sent from the bus arbiter to the module #3. Numeral 213 denotes a bus mastership request signal (BREQ0-N) sent from a module #0 to the bus arbiter incorporated therein. Numeral 214 denotes a bus use grant signal (BGNT0-N) sent from the bus arbiter incorporated in the module #0 to the module #0.

In FIG. 7, each of numerals 700 through 703 denotes a basic transfer block formed by collecting four data cycles as a cluster. Numeral 700 denotes a basic transfer block of a command/address phase, and each of numerals 701 through 703 denotes a basic transfer block of a data phase. Each of numerals 704 through 707 denotes timing of an acknowledge signal outputted from the slave module which has received a transferred signal. In FIG. 8, each of numerals 800 through 803 denotes a basic transfer block formed by collecting four data cycles as a cluster. Numeral 800 denotes a basic transfer block of a command/address phase, and each of numerals 801 through 803 denotes a basic transfer block of a data phase. Each of numerals 804, 805 and 807 denotes timing of an acknowledge signal outputted from the slave module which has received a transferred signal. Numeral 806 denotes timing of a retry request signal outputted from the slave module which has received a transferred signal. In FIG. 9, each of numerals 900 through 904 denotes a basic transfer block. In FIG. 10, numerals 1000, 1001 and 1002 denote transfer signals outputted from respectively different bus masters. Numerals 1002, 1003 and 1004 denote respective source clocks. Numerals 1005, 1006 and 1007 denote respective data transfer cycles. Each of numerals 1008 and 1010 denotes an interval during which a source clock is not outputted because any module is not conducting transfer. Each of numerals 1009 and 1011 denotes an arbitration interval.

Figure 11:
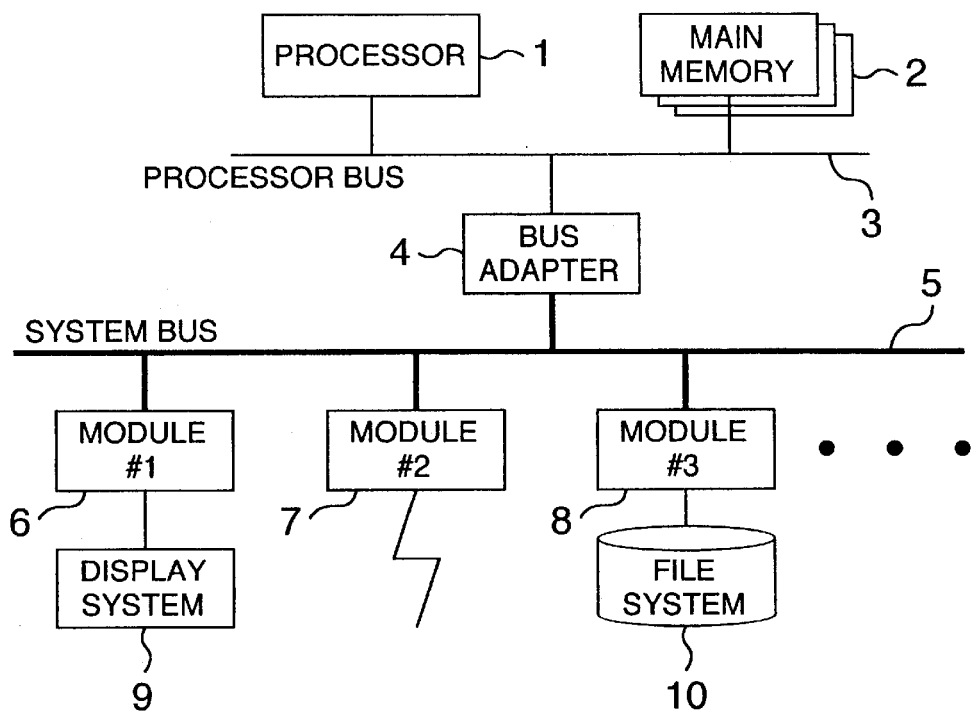
FIG. 11 is a configuration diagram of an example of an information processing system using a bus of the present invention.
Figure 12:
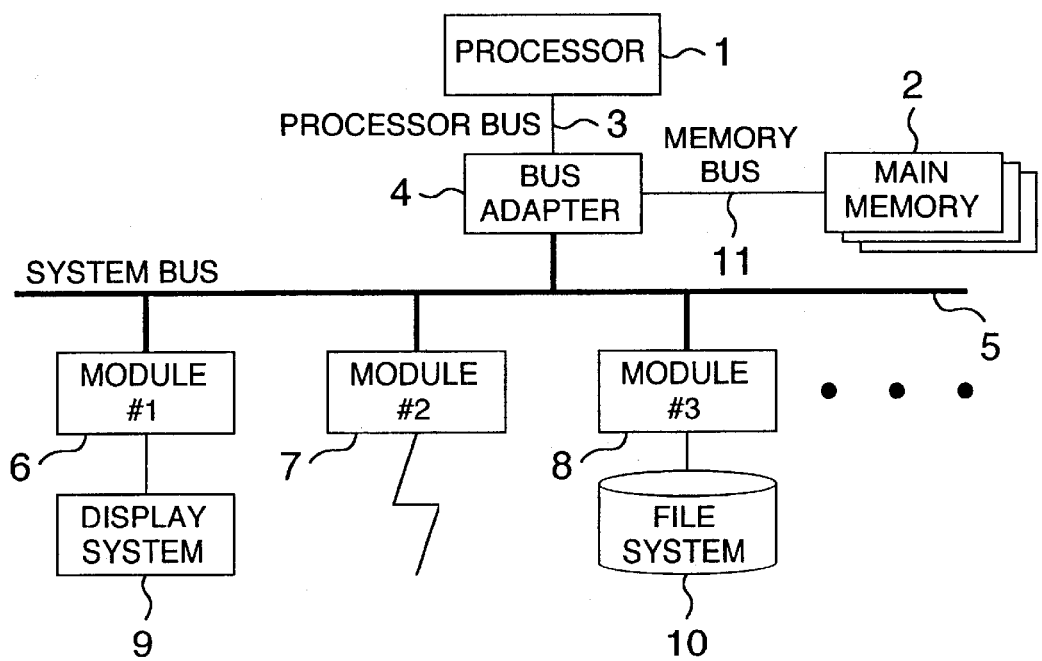
FIG. 12 is a configuration diagram of an example of an information processing system using a bus of the present invention.
Figure 13:
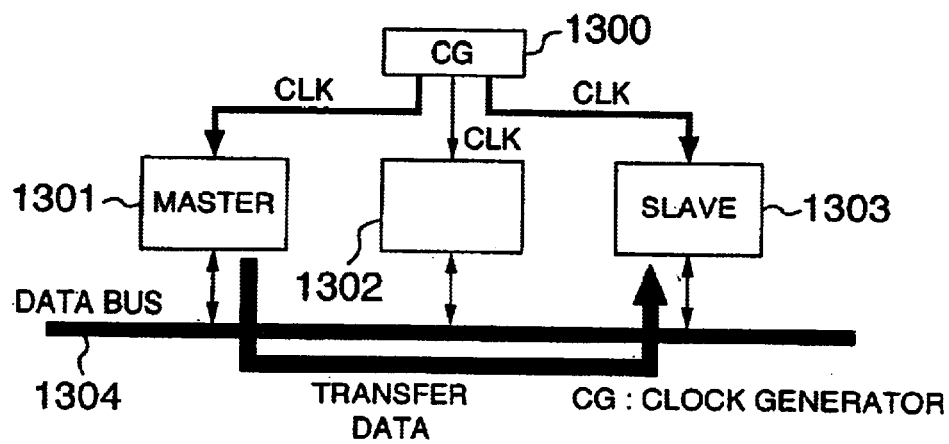
FIG. 13 is a configuration diagram showing a basic transfer system of a conventional common clock synchronous bus.
Figure 14:
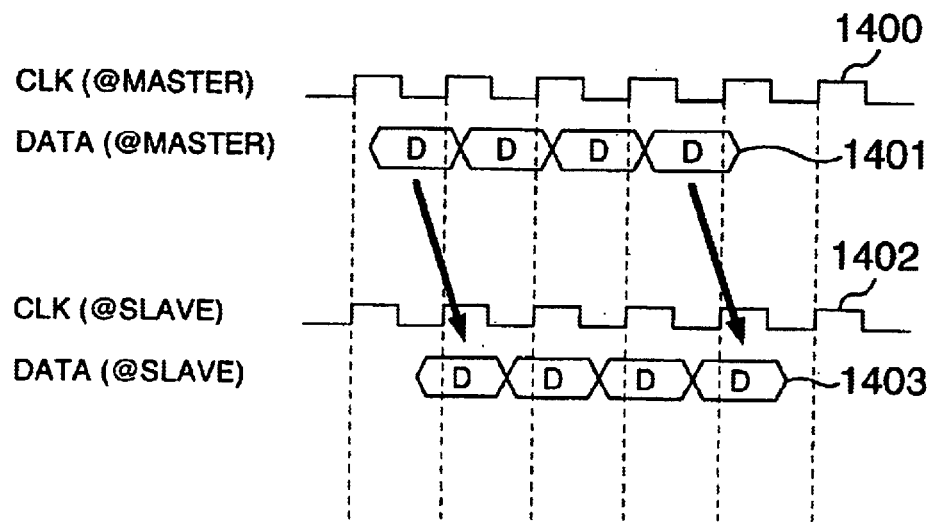
FIG. 14 is a timing chart showing a basic transfer system of a conventional common clock synchronous bus.
Figure 15:
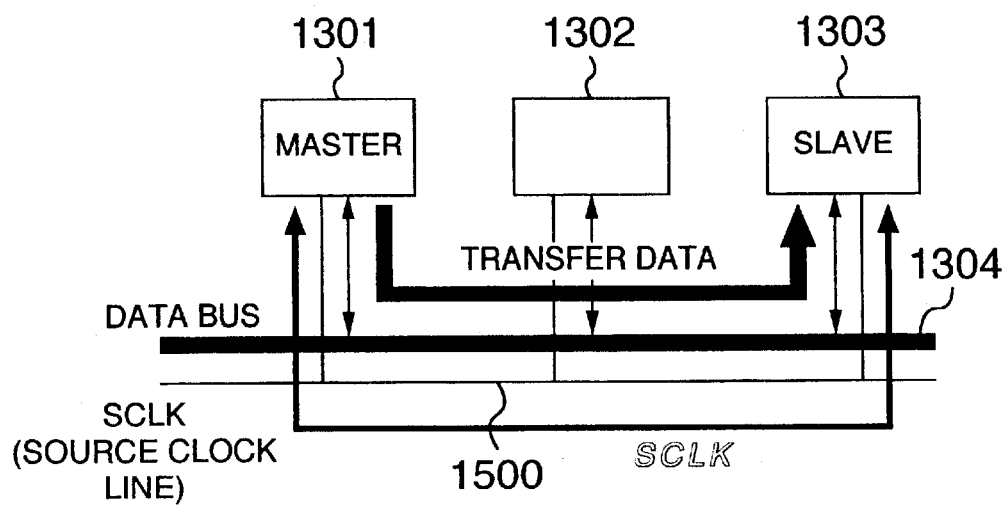
FIG. 15 is a configuration diagram showing a basic transfer system of a source clock synchronous bus.
Figure 16:
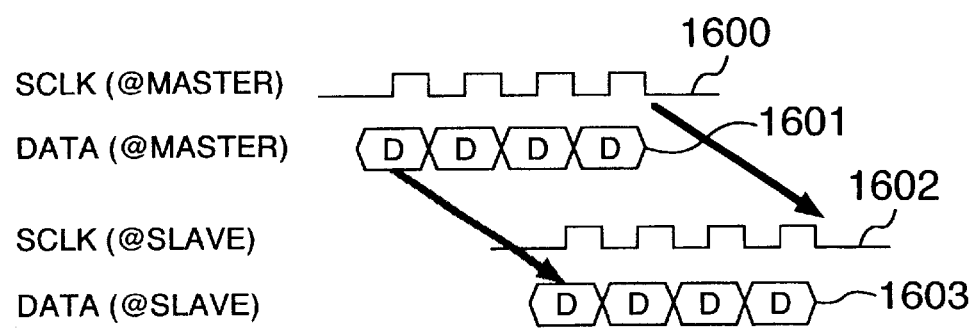
FIG. 16 is a timing chart showing a basic transfer system of a source clock synchronous bus.
Figure 17:
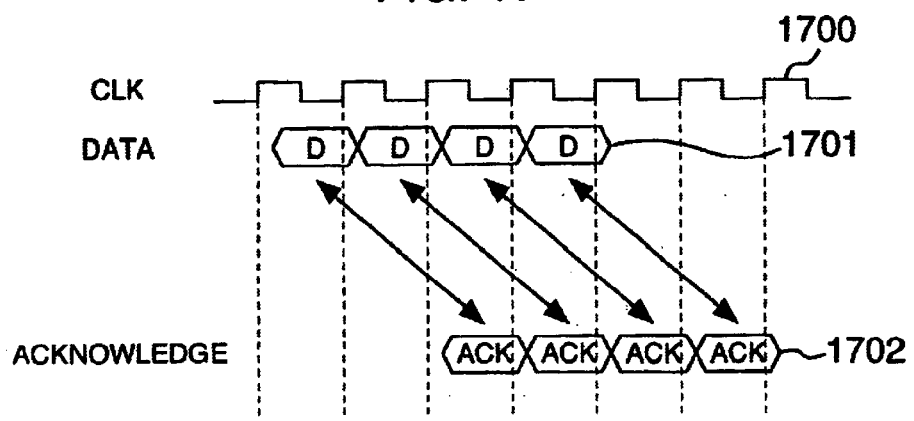
FIG. 17 is a timing chart showing a basic transfer system of a common clock synchronous bus with acknowledge.

In FIG. 11, numeral 1 denotes a processor, 2 a main memory, 3 a processor bus, 4 a bus adapter, and 5 a system bus of the present invention. Numerals 6, 7 and 8 denote modules on the system bus. Numeral 9 denotes a display system I/O (input/output) device, and numeral 10 denotes a file system I/O device. In FIG. 12, numeral 11 denotes a memory bus.

Figure 18:
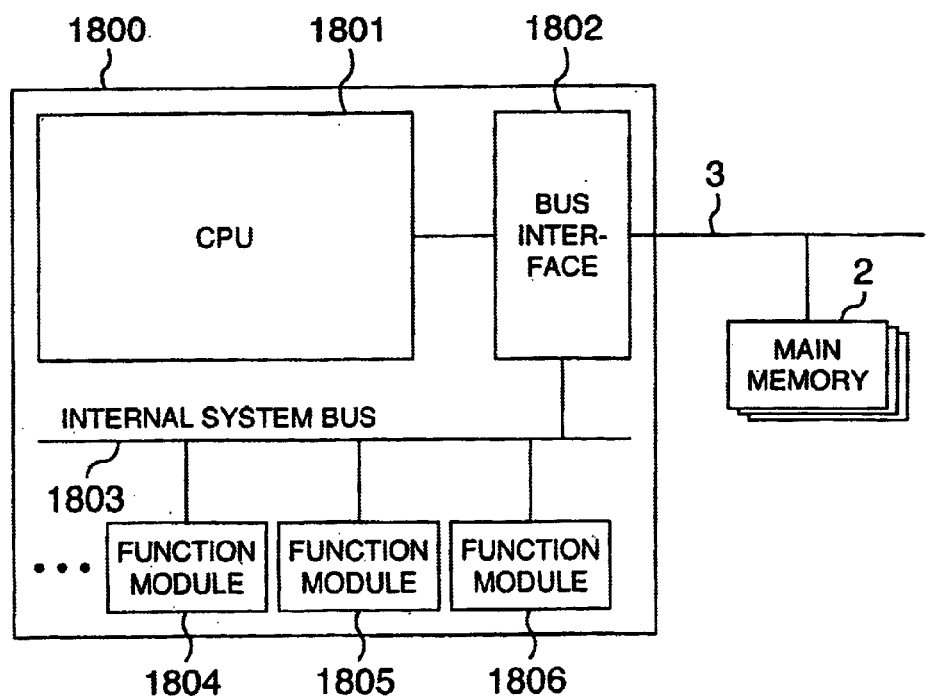
FIG. 18 is a block diagram showing a system configuration example in the case where a bus of the present invention has been applied to an internal bus of an LSI.

In FIG. 18, numeral 1800 denotes a processor obtained by integrating peripheral function modules together therewith into one chip. Numeral 1801 denotes a CPU core. Numeral 1802 denotes a bus interface for controlling an external bus and an internal system bus of the processor. Numeral 1803 denotes an internal system bus for peripheral function modules included within the processor 1800. Numerals 1804, 1805 and 1806 denote peripheral function modules incorporated in the processor 1800.

Figures 3A, 3B, 4:
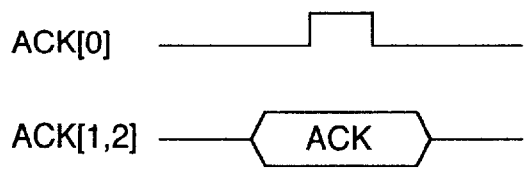
FIG. 3A is a list of meaning of acknowledge type signal lines in the bus of the present invention.
FIG. 3B is an output timing diagram of acknowledge type signals.
FIG. 4 is a command list of a multiplexed command/address/data bus of the bus of the present invention at the time of command output.
Figure 5:
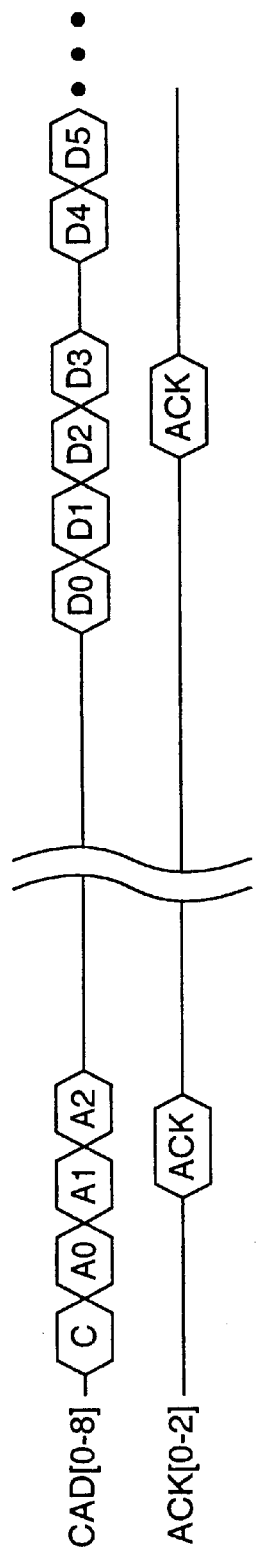
FIG. 5 is a timing chart of the present bus at the time of reading.
Figure 6:
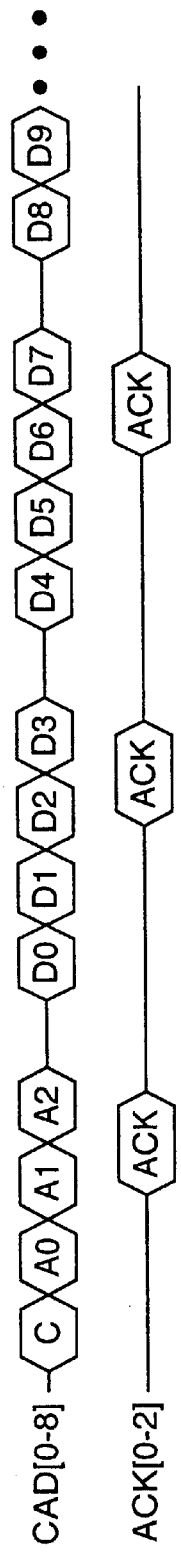
FIG. 6 is a timing chart of the present bus at the time of writing.

First of all, the system configuration will now be described. In the present embodiment, a bus protocol of the present invention has been applied to a system bus of an information processor as shown in FIG. 11 or 12. As shown in FIG. 2, signal lines of the system bus are one source clock signal line (203), nine multiplexed command/address/data lines (204), acknowledge type signal lines (205), and a last cycle signal line (206) whereby the bus master gives a previous notice that the mastership will be canceled. CAD [0-8] denotes one byte data and one parity. Basic transfer timing is shown in FIGS. 5 and 6. FIG. 5 shows read operation, and FIG. 6 shows write operation. Each of read and write operations commences with a command/address phase of four cycles. A first cycle of the command/address phase is a command cycle. Details of the command cycle are shown in FIG. 4. In the command cycle, CAD[4-7] are reserve bits. Three cycles of the command/address phase following the reserve bits are address cycles, and have a 24 bit address. As shown in FIG. 5, the read operation is conducted according to a split transfer protocol. A module which has conducted reading releases the bus mastership when the command/address phase has finished. A module which has been read acquires the bus mastership when data are ready, and starts the data cycle for the master. On the other hand, as for the write operation, a bus master module serving as a transfer source executes the data cycle subsequently to the command/address phase. Control of signals of the acknowledge type in these transfer operations is shown in FIGS. 3A and 3B. The acknowledge type signals are transmitted to the master by slave modules of respective operations by using ACK[0-2] during the interval of the basic transfer block. As shown in FIG. 3B, ACK[1, 2] denotes acknowledge data, and ACK[0] denotes a source clock signal line whereby the master side latches the ACK[1, 2]. Furthermore, the meaning of the ACK[1, 2] is shown in FIG. 3A. A timing chart in the case where other transfer has been inserted in the data phase of read transfer is shown in FIG. 7. A timing chart in the case where a retry request is issued from the slave module side at the time of write transfer of the bus is shown in FIG. 8. In the present bus, control of the acknowledge type is conducted for each basic transfer block. In addition, arbitration can be conducted for each basic transfer block so that one module will not occupy the bus too much.

In the source clock synchronous bus, there is a possibility that there are mixedly modules having different frequencies. Even if the basic transfer blocks are fixed to four cycles, therefore, the time varies according to bus masters. As shown in FIG. 9, therefore, there is provided a last cycle (LC) which is a bus mastership release previous notice signal. As a result, arbitration of the bus by taking a basic transfer block as the unit becomes possible. It is possible to give priority to transfer having paramount urgency. It is thus considered to be suitable for handling of multimedia data as well. Finally, the internal structure of the bus interface unit common to the modules is shown in FIG. 1.

In the present invention, the signals of the acknowledge type are also transferred in the source clock synchronous system by using a source clock signal dedicated to signals of the acknowledge type. Therefore, it is prevented that the master side fails in acquiring signals of the acknowledge type from the slave side. It is possible to improve the reliability of the source clock synchronous bus and the data efficiency. Furthermore, since an acknowledge signal is provided for each basic transfer block having a substantial number of cycles, control becomes possible even if there are mixedly modules having different operation frequencies. Furthermore, since the bus clock completely stops in an interval during which transfer is not being conducted as shown in FIG. 10, it is useful to reducing power dissipation of the system as a whole.

Heretofore, application of the source clock synchronous bus to the system bus of the information processor has been described. Even if the present system is applied to an internal bus of an LSI, its effect is obtained. FIG. 18 shows an example of application thereof. There is a possibility that modules integrated together on a processor are various interfaces having frequencies different from the frequency of the processor. Therefore, the source clock synchronous bus on which modules having different clock frequencies can be mixedly present is effective.

In the present invention, the signals of the acknowledge type are also transferred in the source clock synchronous system by using a source clock signal dedicated to signals of the acknowledge type. Therefore, it is prevented that the master side fails in acquiring signals of the acknowledge type from the slave side. It is possible to improve the reliability of the source clock synchronous bus and the data efficiency. Such effects are obtained. Furthermore, since an acknowledge signal is provided for each basic transfer block having a substantial number of cycles, control becomes possible even if there are mixedly modules having different operation frequencies. Furthermore, since the bus clock completely stops in an interval during which transfer is not being conducted as shown in FIG. 10, there is obtained an effect that it is useful to reducing power dissipation of the system as a whole.

What is claimed is:

1. An information processing apparatus comprising:

a master module serving as a transfer source;

a slave module serving as a transfer destination;

a bus of a source clock synchronous system for transferring a source clock of said master module to be used by said slave module as a latch clock to said slave module together with data; and means for transferring a signal based on an acknowledge type protocol that is carried out once at a plurality of transfer cycles from said slave module to said master module in said source clock synchronous system by using said bus, wherein said source clock is not output while transfer of the signal based on said acknowledge type protocol is not carried out.

2. An information processing apparatus according to claim 1, wherein said source clock is not output during a period of time after transfer of the signal based on the acknowledge type protocol.

3. An information processing apparatus according to claim 1, wherein the signal based on the acknowledge type protocol includes an acknowledge report indicating that the transfer from said master module to slave module was carried out correctly.

4. An information processing apparatus according to claim 1, wherein the signal based on the acknowledge type protocol includes a retry request for requesting a re-execution since said slave module indicates that it did not receive the transfer from said master module.

5. An information processing apparatus according to claim 1, wherein the signal based on the acknowledge type protocol includes an error report indicating that the transfer from said master module to said slave module was not carried out correctly.

6. An information processing apparatus according to claim 1, wherein a read operation from said master module to said slave module is carried out by a split transfer.

7. An information processing apparatus according to claim 1, wherein a source clock signal line exclusively used for an acknowledge type protocol is provided for said bus.

8. An information processing apparatus according to claim 1, wherein said master module includes a processor.

9. An information processing apparatus according to claim 1, wherein said slave module include an input/output device.

10. An information processing apparatus according to claim 1, wherein another transfer occurs after an arbitrary period subsequent to a period when said source clock is not output.

* * * * *